(12) United States Patent
Teidemann

(10) Patent No.: US 6,453,523 B1
(45) Date of Patent: Sep. 24, 2002

(54) STEPLADDER SECUREMENT DEVICE

(76) Inventor: Henry Teidemann, 41 Tilden Rd., Scituate, MA (US) 02066

( * ) Notice: Subject to any disclaimer, the term of this patent is extended or adjusted under 35 U.S.C. 154(b) by 0 days.

(21) Appl. No.: 09/584,122

(22) Filed: May 31, 2000

(51) Int. Cl.[7] .................................................. A44B 1/04
(52) U.S. Cl. ............... 24/546; 248/231.81; 248/229.16; 248/228.7; 224/560; 24/570
(58) Field of Search .......................... 24/546, 570, 563, 24/10 A, 10 R, 3.12, 336, 3.1; 248/316.7, 902, 231.81, 229.16, 228.7; 211/119.003; 224/560, 561, 482

(56) References Cited

U.S. PATENT DOCUMENTS

| | | | | |
|---|---|---|---|---|
| 1,958,934 A | * | 5/1934 | Williams | 24/336 X |
| 2,213,234 A | * | 9/1940 | Tinnerman | 403/42 |
| 5,340,071 A | * | 8/1994 | Fox, III | 248/231.81 |
| 5,489,078 A | * | 2/1996 | Risley | 248/231.81 |
| 6,079,679 A | * | 6/2000 | Mitchell | 248/229.16 |

* cited by examiner

*Primary Examiner*—Robert J Sandy

(57) ABSTRACT

The present invention relates to an apparatus for securing a stepladder comprising in combination a clamp comprising two opposite walls formed of a substantially rigid material, said walls being arranged and constructed such that said walls are adapted to fixedly secure an article therebetween; and a retaining ledge with two ends, one said end is continuous with one said opposite wall of said clamp and the second end being parallel and adjacent to said opposite wall of said clamp, wherein said parallel and adjacent end is positioned with relation to the continous end to form an ledge for insertion, retention and retraction of the siding of a stepladder.

3 Claims, 2 Drawing Sheets

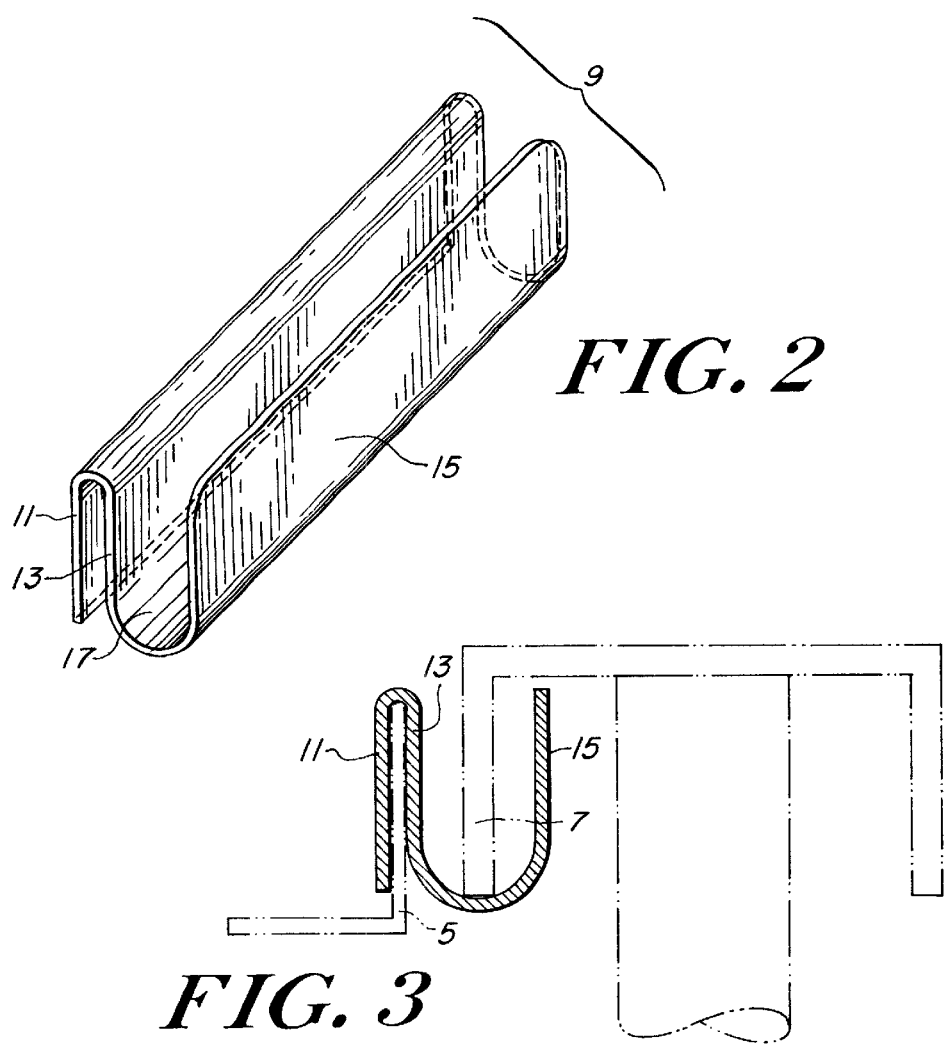
FIG. 2
FIG. 3
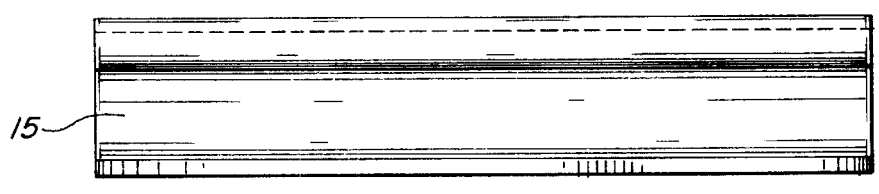
FIG. 4
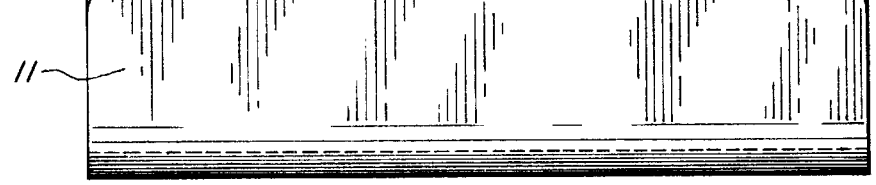
FIG. 5

STEPLADDER SECUREMENT DEVICE

BACKGROUND OF THE INVENTION

1. Field of the Invention

This invention relates in general to a supporting device for the secure placement of ladders and stepladders, typically within the confines of a transporting vehicle.

2. Description of the Prior Art

Tradespeople employ stepladders as enabling means of performing certain tasks that are required in their profession. Stepladders are transported in vehicles used by tradespeople such as enclosed vans and open bed trucks. Typically, the stepladder is simply placed into an open space within a van or in the open bed of a truck, without firm securement.

This method of transporting stepladders poses significant safety concerns. First, should a stepladder be sent in motion due to sudden acceleration or deacceleration of its transporting vehicle, the stepladder could strike and damage articles in its surroundings, such as tools and materials. Secondly and more importantly, an unsecured stepladder set into an uncontrolled motion could contact and harm occupants within the vehicle should the vehicle be a van or it could contact and harm people outside the vehicle should the vehicle be an open bed truck. These events most certainly would occur during traffic accidents.

Currently, there are two means in use for the support of stepladders while they are being transported. However both of these methods have disadvantages and shortcomings. First, elastic cords are being used to secure stepladders. These cords, however, are capable of breaking and it is often difficult to locate appropriate attachments for the ends of the elastic cords. In addition, elastic cords are subject to inadvertent loss which, obviously, prevents their use. Secondly, extending brackets also are used for stepladder securement, Typically, they extend outward from an inside wall or shelving of a van or truck, for a distance which exceeds the entire width of a stepladder. These brackets, when not in use, have an extended profile and ordinarily have sharp edges which pose the risk of the brackets catching the leg or arm of a tradesperson and causing harm.

A device or apparatus which circumvents the problems mentioned above, associated with safety and the inadequacies of the current means of providing support for stepladders would be particularly useful to tradespeople in the plumbing and electrical professions, and consequently, society at large.

SUMMARY OF THE INVENTION

The present invention relates to an apparatus for securement of a stepladder in the confines of a transporting vehicle. The invention comprises in combination a clamp comprised of two opposite walls formed of a substantially rigid material, wherein the walls are arranged and constructed such that they can fixedly secure to an article between them such as a shelving lip; and a retaining shelf of similarly rigid material with two ends, one end is continuous with one of the opposite walls of the clamp and the second end is separate from the opposite walls of said clamp, wherein said separate end is positioned with relation to the continous end to form an aperature for retention of the siding of a stepladder.

The present invention provides a number of advantages over the prior art. First, due to the substantially lower profile of the the present invention, it can provide greater safety to tradespeople moving about the interior of a van or inside the open bed of a truck. Secondly, it provides for a greater degree of reliability in that it is comprised of a substantially rigid material and it is not susceptible to breakage. Thirdly, it provides for ease and convenience of storage. When a stepladder is retained by the present invention it is secured in a specific position within a vehicle, and consequently, is unobstuctive to tradespeople moving about the confines of a vehicle. Lastly, the present invention provides for ease of removal of a stepladder form the confines of a vehicle. If an elastic cord or extended brackets are used to secure a stepladder, the tradesperson must actually enter the vehicle to properly disengage the stepladder from the cords or brackets. With the present invention, however, a tradesperson can merely reach into a vehicle with one arm and easily remove the stepladder. Consequently, the present invention provides for greater safety, reliable storage, unobstructive securement and ease of operation.

BRIEF DESCRIPTION OF THE DRAWINGS

FIG. 2 is a diagramatic representation of an angular view of the present invention and illustrates the components of a device, including the clamp (between #11 and #13) and the retaining ledge (between #13 and #15).

FIG. 3 is a diagramatic representation of a cross-sectional view of the present invention used in conjunction with the siding of a stepladder, illustrating the components of the present invention a shelving unit and a stepladder interacting when in operation together.

FIG. 4 is a diagramatic representation of a frontal view of the present invention.

FIG. 5 is a diagramatic representation of a back view of the present invention.

DETAILED DESCRIPTION OF THE INVENTION

Definitions

Figure 1:
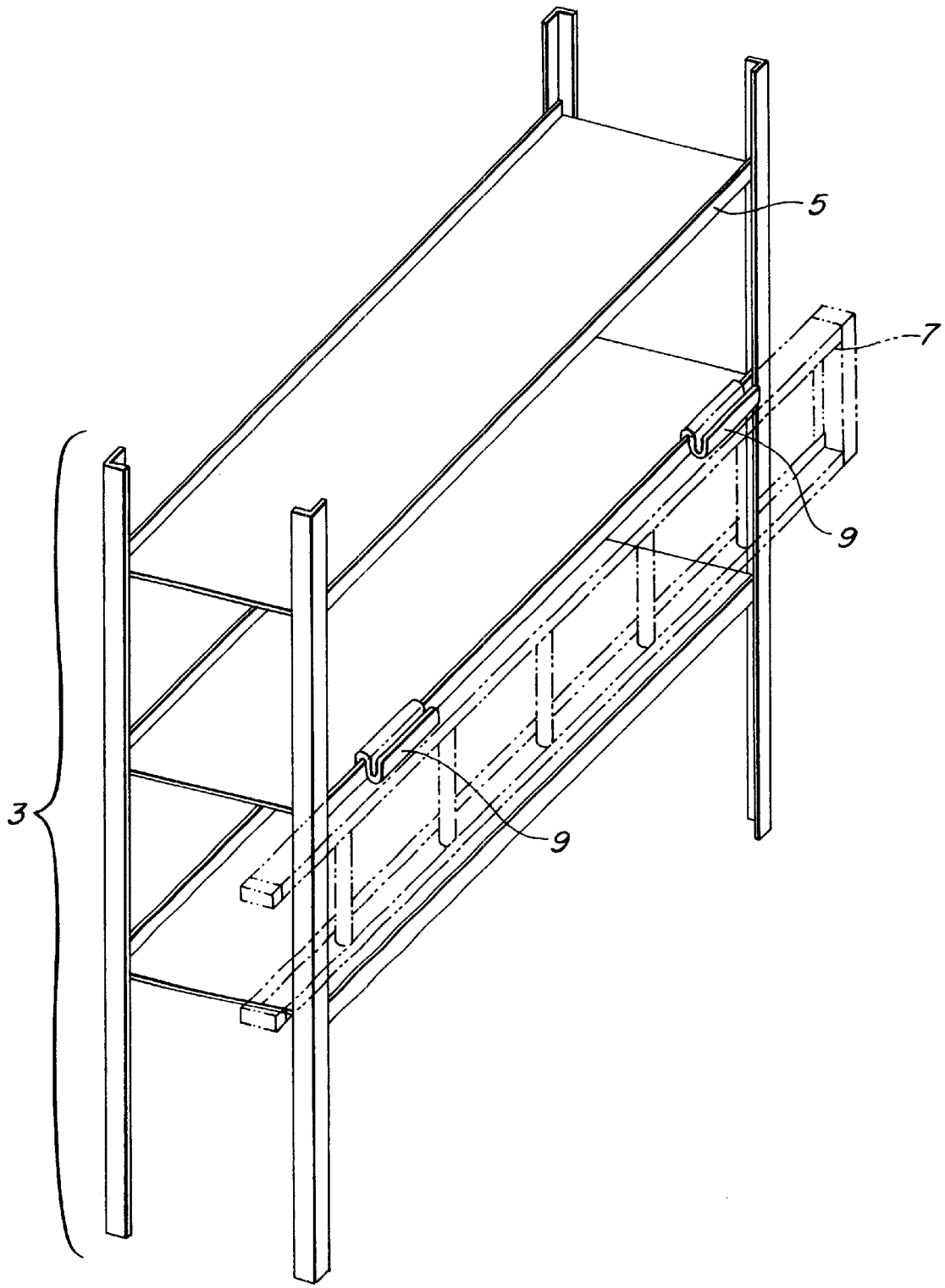
FIG. 1 is a diagramatic representaion of the present invention as it is used in conjunction with a stepladder to provide for storage and securement to the outside of a shelving unit.

The following terms are herein defined for the purpose of describing the invention.

FIXEDLY SECURED can be defined as affixing, attaching or grasping an object to another, either by attachment or being contained between or within. In the context of the present invention, the clamp fixedly secures the lip of a shelving unit to provide for secure placement of the present invention to the shelving unit in a van or a truck.

OPENING (including open) can be defined as an area through which unobstructed access to the interior of a structure is gained; or an unobstructed entrance and exit, not shut or closed. In the context of the present invention, an open area can be found within the confines of the interior of a vehicle such as a van or the open bed of a truck, as well as in spaces between the walls of the clamp and the walls of the retaining ledge of the present invention.

INSERTION can be defined as the introduction into or between the body of a structure. In the context of the present invention, the lip of a shelving unit can be inserted into the clamp of the present invention or the siding of a stepladder can be inserted into the retaining ledge of the present invention.

RETENTION can be defined as being held in place or in position. In the context of the present invention, the stepladder is retained when it is held in place or secured in the retaining ledge of the present invention.

RETRACTION can be defined as being withdrawn or removed from a place or position. In the-context of the present invention, a stepladder is retracted when it is removed or withdrawn from the retaining ledges-of the present invention.

ENGAGE can be defined as causing mechanical parts to mesh; to bring together or interlock. In the context of the present invention, the clamp of the present invention engages the lip of a shelving unit and the retaining ledge of the present invention engages the siding of a stepladder.

POSITIONING can be defined as being placed in a location. In the context of the present invention, positioning refers to the placement of the present invention along the lip of a shelving unit, as well as the placement of the siding of a stepladder into the retaining ledge of the present invention.

Stepladder Securement Device

The present invention is a structure including but not limited to the following characteristics:

Composition

The material used to comprise the present invention can be one having a high rigidity and hardness combined with toughness and and a certain degree of resilience. Such material can also be thermofornable, preferably by a conventional thermoforming or injection molding process. Alternatively, the material can be comprised of a substance capable of extrusion which when cooled has the characteristics mentioned above. Suitable materials are aluminum, steel or an alloy. A suitable thermomoldable sheet or extrusion material for forming the present invention will have a thickness of about 1/8th to 1/4 of an inch more or less. The length of the device can be one to ten inches with a preferred length of three to five inches.

Clamp

The clamp must have a structure which permits the insertion, retention and retraction of the present invention from a shelving lip. As such, the structure of the clamp must provide for an opening, but also provide a means for containment and tension or friction about a shelving lip, such that the tension or friction is sufficient to prevent accidental withdrawal or retraction.

The clamp is comprised of two extending, parallel, adjacent, separate and opposite walls, continuous at one end and open at the opposing end. In addition, the distance between the opposite walls should be sufficiently small to provide a level of tension on the lip of a shelving unit, so-that the clamp is not easily dislodged from its engaged position upon the shelving lip.

Retaining Ledge

The retaining ledge shares a common wall with the clamp and, consequently, is continuous with the clamp. However, a retaining ledge could be separate from the clamp and fixedly secured to it by a fastening means. The retaining ledge should extend adjacent to the clamp for a distance and then parallel to the continuous wall (i.e., the common wall of the clamp and the retaining ledge) of the clamp to form an open structure and ending unfixed. The unfixed end is referred to as, the projected edge. In addition, the distance between the common wall and the projected edge should be sufficient to allow for insertion, retention and retraction of the siding of a stepladder.

Construction

Construction of the components of the invention which are comprised of aluminum, steel or alloy can be achieved by mass manufacturing using an injection molded process, manual or automatted thermomolding or by extrusion, all of which can be practiced by one of ordinary skill in the art. A preferred method of forming the present invention is as follows:

a) a oblong panel of thermomoldable aluminum (or steel or alloy) is exposed to heat at a position of approximately one-third the length of the oblong panel and folded at that heated position to form a clamping structure with an opening, comprising the two opposite walls of the clamp, b) the folded over clamp and continuous metal is cooled to permit hardening of the metal, c) the remaining one-third of the oblong panel is manually formed to construct a retaining ledge, the one-third panel is folded to lie parallel and adjacent to the opposite and common wall of the clamp to which it remains continuous to form a projecting edge, with the distance between the continuous opposite and common wall and the projecting edge being sufficient to allow for the insertion, retention and retraction of the siding of the stepladder, d) the entire structure being allowed to cool and harden to the invention's permenant dimensions, and e) the completed device is then used for the constuction of a cast for the injection molding process and mass production of stepladder securement devices In Operation In typical operation for the securemnent of a stepladder, two devices of the present invention are required. They are positioned along the lip of a shelving unit within a transporting vehicle. The distance between each device should be an appropriate distance to allow an even displacement of the stepladder's) eight. This distance is typically three to five feet. A stepladder is positioned by placing a siding of the stepladder into the retaining ledges of the securement devices. The stepladder is retrieved by simple retraction of the ladder from the retaining ledges.

Preferred Embodiment of the Invention

The preferred embodiment of the resent invention relates to a stepladder securemnent device used in conjunction with a shelving unit in the confines of a transporting vehicle such as a van or truck. The preferred embodiment and its use is illustrated in FIGS. 1 thru 5.

The securement devices are comprised of a clamp (#11 and #13) and a retaining ledge (#17). The clamp and the retaining ledge share a common wall (#13). The clamp is formed between a separate wall (#11) and the common wall (#13). The retaining ledge is formed between the common wall (#13) and the projected edge (#15). The clamp (#11 and #13) is positioned on the lip (#5) of a shelving unit (#3). The siding of a stepladder (#7) is positioned in the retaining ledges (#7) of the securement devices. The rung (#19) of the stepladder is depicted adjacent to the projected edge (#15).

Equivalents

Those skilled in the art will recognize, or be able to ascertain using no more than routine experimentation, many equivalents to the specific embodiments of the invention described specifically herein. Such equivalents are intended to be encompassed in the scope of the following claims.

I claim:

1. An apparatus for securement of a stepladder, comprising in combination:

(a) a clamp comprising two opposite walls formed of a substantially rigid material, said walls being arranged and constructed such that said walls are adapted to fixedly secure an article therebetween; and (b) a retaining ledge for the siding of a stepladder comprising two ends, one said end is continuous with one said opposite wall of said clamp and the second end being parallel and adjacent to said other opposite wall of said clamp, wherein said parallel and adjacent end is positioned with relation to the continous end of form a ledge for the insertion, retention and retraction of the siding of a stepladder.

2. An apparatus of claim 1 wherein said article is a shelving lip.

3. An apparatus of claim 1 wherein said rigid material is comprised of aluminum, steel or an alloy.

* * * * *